United States Patent [19]
De Bock

[11] Patent Number: 5,927,863
[45] Date of Patent: Jul. 27, 1999

[54] MACHINE WITH BEARING-MOUNTED ROTORS AND LIQUID-LUBRICATED BEARINGS

[75] Inventor: Richard De Bock, Molenhoekstraat, Belgium

[73] Assignee: Atlas Copco Airpower, Naamloze Vennotschap, Wilrijk, Belgium

[21] Appl. No.: 08/994,188

[22] Filed: Dec. 19, 1997

[30] Foreign Application Priority Data

Dec. 23, 1996 [BE] Belgium ................................ 09601077

[51] Int. Cl.$^6$ ........................................................ F16C 33/66
[52] U.S. Cl. ............................ 384/468; 384/466; 184/6.26
[58] Field of Search .................................... 384/462, 466, 384/468, 471, 473, 474; 184/6.26

[56] References Cited

U.S. PATENT DOCUMENTS

| 4,759,427 | 7/1988 | Onose et al. | 384/466 X |
| 5,288,154 | 2/1994 | Jost | 384/468 X |

FOREIGN PATENT DOCUMENTS

| 154673 | 9/1985 | European Pat. Off. . | |
| 24700 | 2/1983 | Japan | 384/468 |
| 2127490 | 4/1989 | United Kingdom . | |

*Primary Examiner*—Thomas R. Hannon
*Attorney, Agent, or Firm*—Bacon & Thomas, PLLC

[57] ABSTRACT

A machine with bearing-mounted rotors includes a housing (1) and two cooperating rotors erected therein which are supported on bearings (8–9 and 11–12, 17–18 and 20–21, respectively) with shafts ends (5 and 5A, 14 and 14A, respectively) at their ends. The shaft ends (5, 14, respectively) of each of the rotors (2 and 3) rest in a pair of bearings (8–9, 17–18, respectively). The bearings (8 and 9) of the one pair are situated opposite the bearings (17 and 18) of the other pair. At least one spray element (27) is erected between the bearings (8 and 9, 17 and 18, respectively) of the pairs (8–9 and 17–18) for spraying lubricating liquid on the bearings (8–9–17–18). Between the bearings (8 and 9, 17 and 18, respectively) of each pair (8–9 and 17–18), a ridged ring (35, 35A respectively) is provided around the shaft and (5, 14, respectively). Each ridged ring (35, 35A) is provided with a protruding ridge (36, 36A, respectively) on its entire outer perimeter. The spray element (27) has nozzles (32, 32A, respectively) directed towards the protruding ridges (36, 36A, respectively) of the ridged rings (35 and 35A).

12 Claims, 3 Drawing Sheets

MACHINE WITH BEARING-MOUNTED ROTORS AND LIQUID-LUBRICATED BEARINGS

BACKGROUND OF THE INVENTION

1. Field of the Invention

The present invention concerns a machine of the type comprising a housing and two cooperating rotors erected therein which are bearing-mounted with shafts at their ends, whereby on at least one end of the housing the shaft of each of the rotors rests in a pair of bearings, whereby the bearings of one pair are situated opposite the bearings of the other pair, and whereby at least one spray element for spraying lubricating liquid on the bearings is erected between the bearings of the pairs.

2. Description of the Related Art

Such machines are, for example, compressors, tube expanders and pumps.

Especially with dry compressors, whereby no lubricating liquid such as oil or water is injected on the rotors, the bearings are usually lubricated by continuously spraying oil on the bearings.

In such known compressors, the spray element contains two tubes directed diagonally on the shafts which reach between the bearings of one pair, the other pair, respectively. The tubes are provided at their ends with nozzles directed sideways on the bearings of the respective pair. As a result, the construction of this spray element is complicated and the oil distribution is not always ideal.

SUMMARY OF THE INVENTION

The present invention aims towards a machine with bearing-mounted rotors which does not show these and other disadvantages and whereby an effective lubrication of the bearings may be obtained with a simple spray element.

This aim is reached according to the invention in that, between the bearings of each pair, a ring is provided around the respective shaft which is provided with a protruding ridge on its outer perimeter. A spray element with nozzles is directed towards the protruding ridges of the ridged rings.

Thus, the spray element no longer sprays a lubricating liquid directly on the bearings, but on the toothed rings which distribute the lubricating liquid with the protruding ridges and deliver it to the two bearings situated on either side thereof. The ridged rings turn along with the shafts and guarantee a good distribution.

The spray element may contain two radial tubes which reach up between the bearings of the two pairs, respectively, and which are preferably connected to an axial tube which is connected to a duct that extends through the housing.

The duct may then be connected to a pump or the like via a pipe.

The above-mentioned aim may also be realized according to another embodiment of the invention in that a stationary outer ring and a rotating inner ring of one of the bearings of each pair extend on the side of the other bearing outside the bearing elements which they hold and in that at least two openings are provided in a protruding part of the stationary outer ring of the first-mentioned bearing of each pair, whereby in or opposite one opening is situated a nozzle of the spray element.

This spray element may contain two radial tubes, one of which extends into one of the openings in the outer ring of the one bearing of one pair and the other of which extends into one of the openings in the outer ring of one bearing of the other pair.

The above-mentioned bearing with protruding parts of the inner and outer rings is preferably a ball bearing and the protruding part of the rotating inner ring of this bearing preferably has a smaller thickness than the part of this inner ring situated on the other side in relation to the balls.

BRIEF DESCRIPTION OF THE DRAWINGS

In order to better explain the characteristics of the invention, the following preferred embodiments of a machine with bearing-mounted rotors and liquid lubrication of the bearings according to the invention are described, as examples only without being limitative in any way, with reference to the accompanying drawings, in which.

DETAILED DESCRIPTION OF THE PREFERRED EMBODIMENTS

Figure 1:
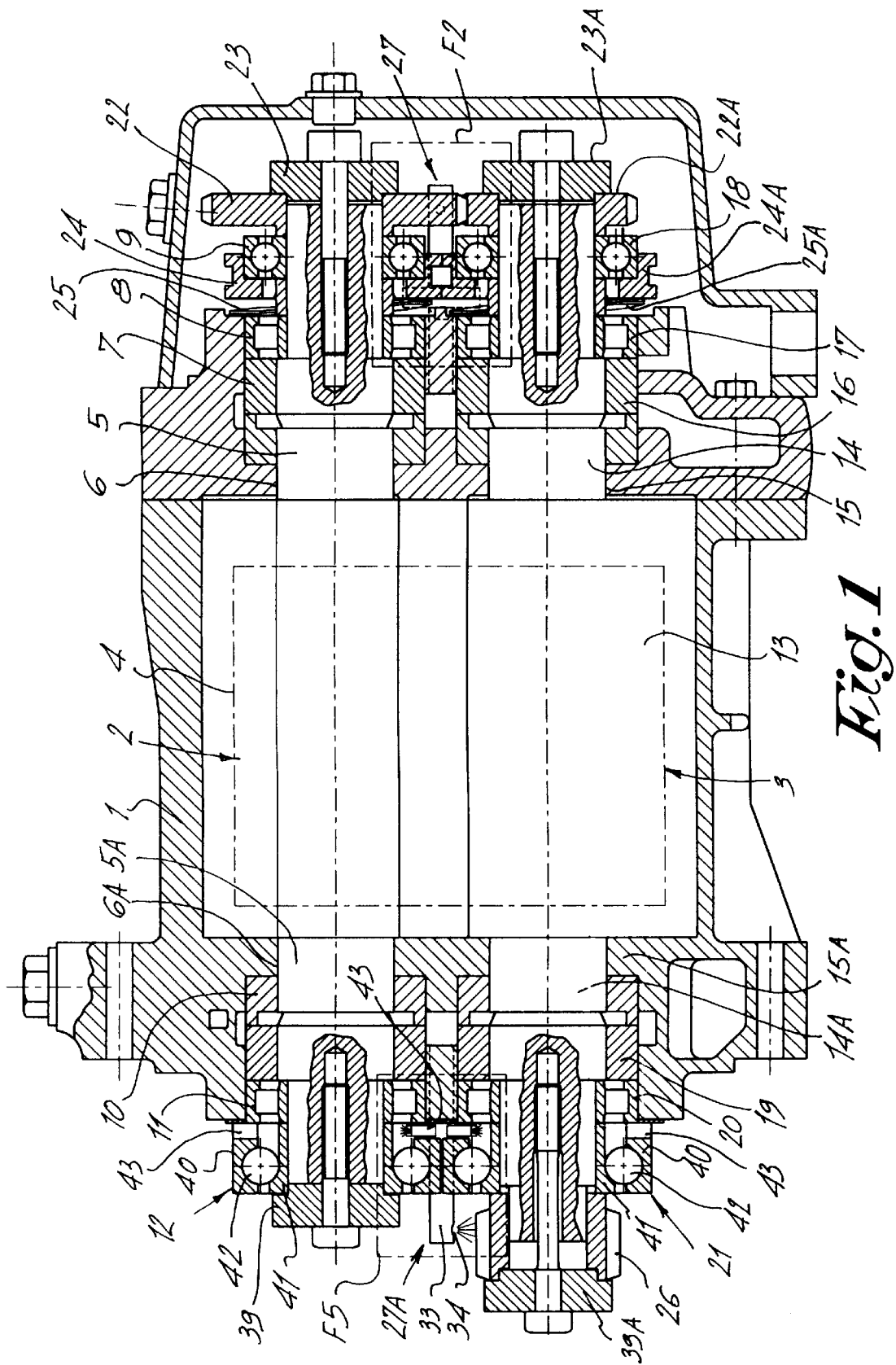
FIG. 1 shows a section view of machine according to the invention made as a compressor.

FIG. 1 shows a screw-type compressor of the dry type, i.e., without any injection of lubricating liquid, which mainly includes a housing 1 and two cooperating rotors which are bearing-mounted therein, namely a first female rotor 2 and a second male rotor 3.

Housing 1 is provided with an air inlet and an outlet for compressed air, which are not represented in the figures.

First rotor 2 has a helical body 4 provided on a shaft with ends 5, 5A which are situated in shaft openings 6, 6A, respectively, in housing 1.

Shaft end 5 is surrounded in shaft opening 6 by a shaft seal 7. On the outside of this seal, shaft end 5 is bearing-mounted in a first pair of bearings, namely a radial bearing 8, for example a roller bearing, which is provided in housing 1, and an axial bearing 9, for example a ball bearing, which surrounds shaft end 5 outside shaft opening 6.

In an analogous manner, shaft end 5A is surrounded at the other end of first rotor 2 by a shaft seal 10 and is bearing-mounted in a second pair of bearings, namely a radial bearing 11, for example a roller bearing, which is situated inside housing 1, and an axial bearing 12, for example a ball bearing, which surrounds shaft end 5A.

Second rotor 3 has a body 13, which is complementary to body 4, provided on a shaft with ends 14, 14A which are situated in shaft openings 15, 15A, respectively, in housing 1.

Shaft ends 14 and 14A are bearing-mounted in the same manner as shaft ends 5 and 5A.

Shaft end 14 is surrounded in shaft opening 15 by a shaft seal 16, which is similar to shaft seal 7, and is bearing-mounted in a third pair of bearings, a radial bearing 17 and an axial bearing 18.

Bearings 17 and 18 of shaft end 14 are situated exactly opposite bearing 8 and bearing 9, respectively, of shaft end 5.

Shaft end 14A is surrounded by a shaft seal 19 and is bearing-mounted in a fourth pair of bearings, a radial bearing 20, for example a roller bearing, and an axial bearing 21, for example a ball bearing. Bearings 20 and 21 are situated exactly opposite bearing 11 and bearing 12, respectively, of shaft end 5A.

On shaft ends 5 and 14, on one end of rotors 2 and 3, synchronization gears 22 and 22A are fixed which work in conjunction with one another such that second rotor 3 drives first rotor 2 synchronously.

Gears 22 and 22A are held against axial bearings 9 and 18, respectively, by end parts 23 and 23A screwed on shaft ends 5 and 14. Bearings 9 and 18 are held against a part of housing 1 by a first ring 24 and a second ring 24A, respectively. Bearings 8 and 17 are held countersunk in housing 1 by a first corrugated spring 25 and a second corrugated spring 25A, respectively.

Second rotor 3 is driven by a motor via a gear wheel 26 on shaft end 14A. Gear wheel 26 is part of a gear wheel transmission, not represented in the figures.

Radial bearings 8, 11, 17 and 20 and axial bearings 9, 12, 18 and 21 are lubricated with lubricating liquid, for example oil.

To this end, the compressor includes a first spray element 27 at one end between first pair of bearings 8, 9 on shaft end 5 and third pair of bearings 17, 18 on shaft end 14. First spray element 27 is connected via a duct 28 through housing 1 to a source of lubricating liquid under pressure, not represented in the figures.

Figure 2:
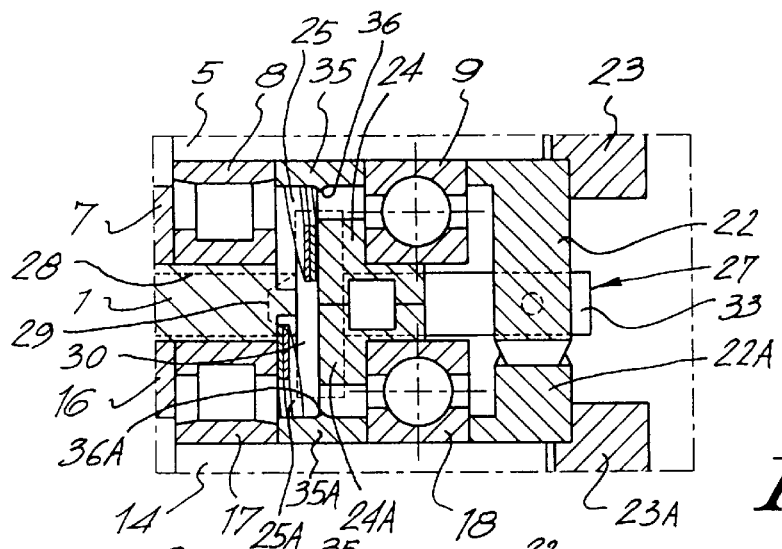
FIG. 2 shows the part indicated with F2 in FIG. 1 to a larger scale.
Figure 3:
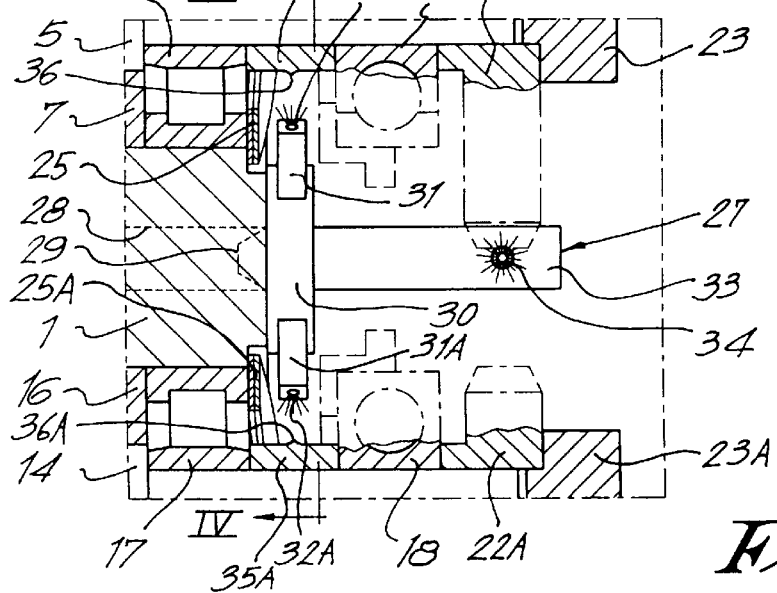
FIG. 3 shows a section view analogous to that of FIG. 2, but parallel to and at a distance from the latter and with partial cut-outs.
Figure 4:
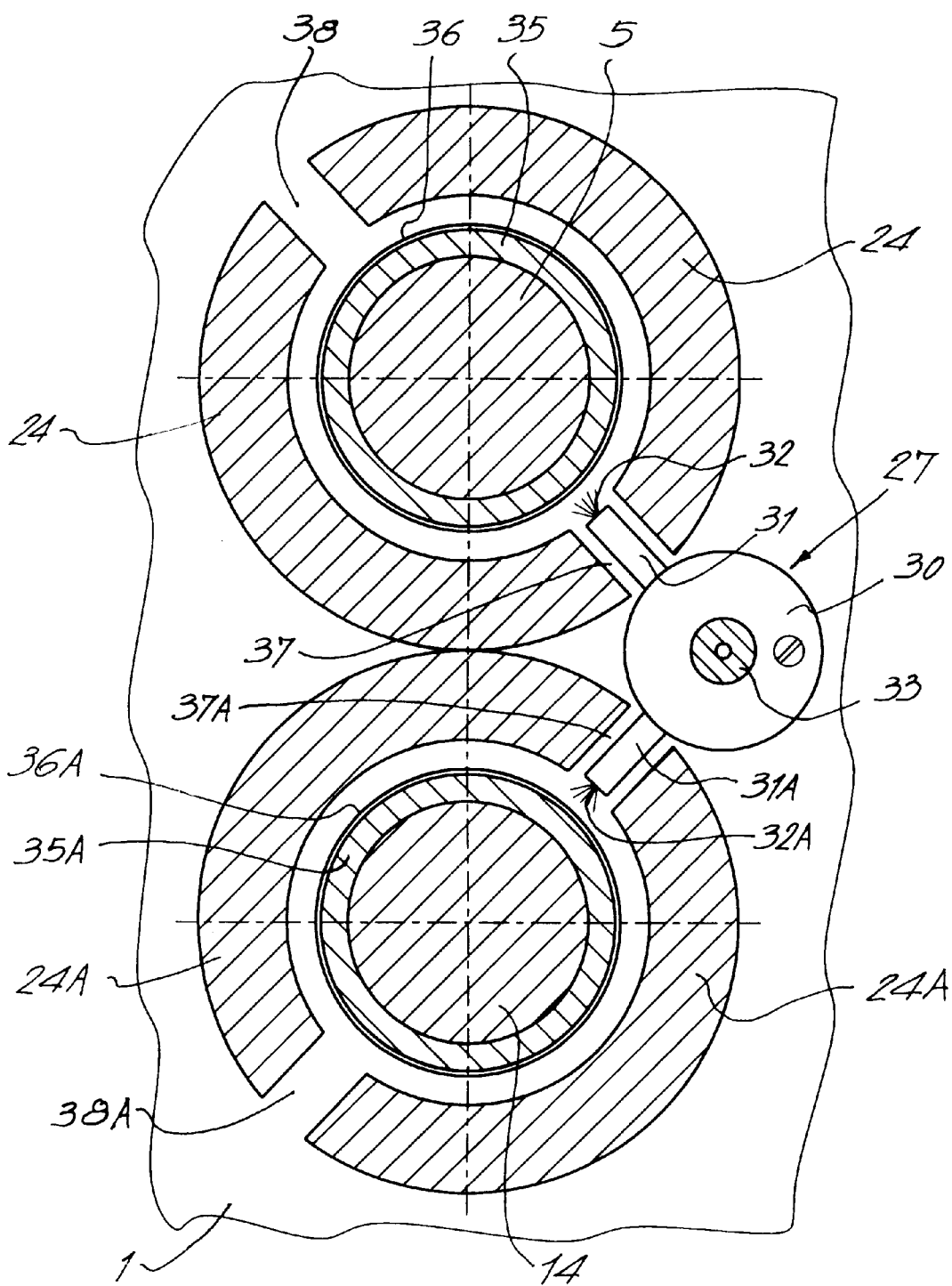
FIG. 4 shows a section view according to line IV—IV in FIG. 3.

As is represented in FIGS. 2 to 4, first spray element 27 comprises: a tube 29 which fits in duct 28; a fixing part 30 with which first spray element 27 is fixed against a part of housing 1; a first and a second sidewardly directed or radial tubes 31 and 31A connected thereto which are provided with a first nozzle 32, a second nozzle 32A, respectively, at their ends and which are connected to the inside of tube 29; and an axial tube 33 which forms the prolongation of tube 29 and which is provided near its end with a sidewardly directed nozzle 34.

Spray element 27 is directed, with radial tubes 31 and 31A, respectively, between bearings 8 and 9 and between bearings 17 and 18, onto a first ridged ring 35 which surrounds shaft end 5 between bearings 8 and 9 and onto a second ridged ring 35A which surrounds shaft end 14 between bearings 17 and 18.

Ridged rings 35 and 35A are provided on their entire outer perimeter with a first protruding ridge 36 and a second protruding ridges 36A, respectively, which have an almost triangular section with two sloping sides running into one point at the top.

First corrugated spring 25 and a part of first ring 24 surround first ridged ring 35 around shaft end 5, whereas second corrugated spring 25A and a part of second ring 24A are situated around second ridged ring 35A.

Also, radial tubes 31 and 31A partly extend into openings 37 and 37A which extend radially through rings 24, 24A, respectively. Diametrically opposite opening 37, 37A is a second opening 38, 38A in ring 24, 24A for discharging the lubricating oil.

Lubricating liquid which is sprayed through first nozzle 32 is directed to bearings 8 and 9 by first protruding ridge 36 of first ridged ring 35 which turns along with shaft end 5. Lubricating liquid which is sprayed through second nozzle 32A onto second protruding ridge 36A of second ridged ring 35A, which turns along with shaft end 14, is directed towards bearings 17 and 18. As a result, bearings 8, 9, 17 and 18 are efficiently lubricated.

Through sidewardly directed nozzle 34, lubricating oil is sprayed on synchronization gear wheel 22 in order to lubricate synchronization gears 22 and 22A.

At the other end of the compressor, bearings 11 and 12 are situated against one another and are pushed against one another by an end part 39 screwed on shaft end 5A. A stationary outer ring 40 of bearing 12 pushes against a part of housing 1.

Both stationary outer ring 40 and a rotating inner ring 41 of axial bearing 12, which is formed of a ball bearing, extend on one side of radial bearing 11 and are thus longer than in a normal ball bearing so that they significantly protrude outside a set of bearing elements, namely balls 42.

Figure 5:
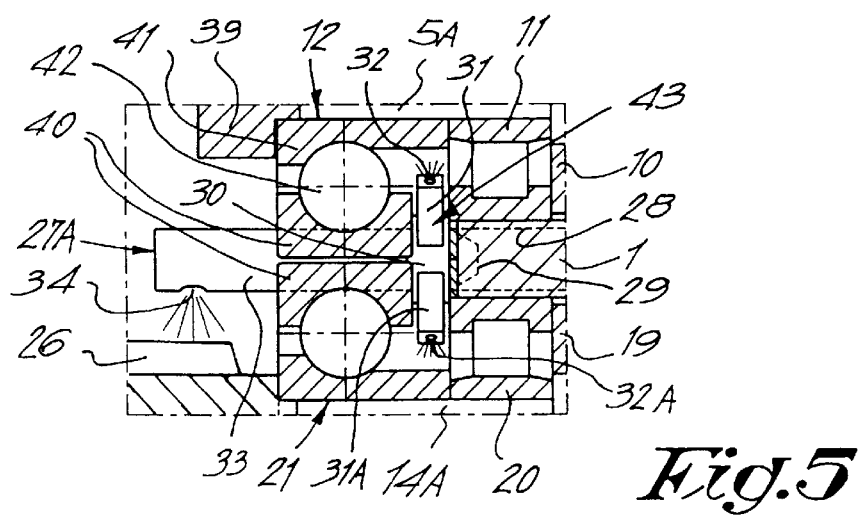
FIG. 5 shows the part which is indicated in FIG. 1 with F5 to a larger scale.

The protruding ring parts have a constant thickness, but the thickness of this part on inner ring 41 is smaller than the thickness of inner ring 41 on the other side of balls 42, as is represented in detail in FIG. 5.

In the protruding part of stationary outer ring 40, radial openings 43 are provided.

Bearings 20 and 21 of shaft end 14A are designed and mounted in the same manner as bearings 11 and 12. They are pushed against one another by end part 39 which is screwed on shaft end 14A and with the help of gear wheel 26, whereby stationary outer ring 40 of bearing 21 pushes against a part of housing 1.

Bearings 11, 12, 20 and 21 are lubricated with oil which is sprayed through a second spray element 27A, which is identical to first spray element 27, and corresponding parts are indicated with the same reference numerals.

First radial tube 31 of second spray element 27A extends into one of radial openings 43 in outer ring 40 of axial bearing 12, whereas second radial tube 31A of second spray element 27A extends into one of radial openings 43 in stationary outer ring 40 of bearing 21, such that oil is sprayed on inner rings 41 and thus on bearings 11 and 12, 20 and 21, respectively, via nozzles 32 and 32A.

Thus is obtained a good lubrication of bearings 11, 12, 20 and 21.

Thanks to integrated ducts 28 in housing 1 and spray elements 27 and 27A, a very well controlled oil distribution may be obtained.

The present invention is by no means limited to the above-described embodiments represented in the accompanying drawings; on the contrary, such machines may be made in all sorts of variants while still remaining within the scope of the invention.

I claim:

1. A machine with bearing-mounted rotors, comprising:
    a housing;
    a first rotor erected in said housing, said first rotor having a first shaft end supported on a first pair of bearings and a second shaft end supported on a second pair of bearings;
    a second rotor erected in said housing, said second rotor having a third shaft and supported on a third pair of bearings which are situated opposite said first pair of bearings and a fourth shaft end supported on a fourth pair of bearings;
    a first ridged ring having an outer perimeter on which a first protruding ridge is disposed, said first ridged ring situated around said first shaft end between said first pair of bearings;
    a second ridged ring having an outer perimeter on which a second protruding ridge is disposed, said second ridged ring situated around said third shaft end between said third pair of bearings; and at least one spray element disposed between said first pair of bearings and said third pair of bearings arranged to spray lubricating liquid on said first and third pairs of bearings via said ridged rings, said spray element having a first nozzle directed towards and between said first pair of bearings and a second nozzle directed towards and between said third pair of bearings.

2. A machine according to claim 1, wherein said at least one spray element comprises a first spray element at one end of said first and second rotors which is directed towards said first and second ridged rings; and wherein the machine includes a second spray element at the other end of said first and second rotors which is directed between said second and fourth pairs of bearings, said second spray element being substantially identical to said first spray element.

3. A machine according to claim 1, wherein said machine comprises a compressor.

4. A machine according to claim 1, wherein said at least one spray element includes a first radial tube which extends between said first pair of bearings and a second radial tube which extends between said third pair of bearings.

5. A machine according to claim 4, further comprising:

a duct extending through said housing; and an axial tube connected to said duct and said first and second radial tubes of said at least one spray element.

6. A machine with bearing-mounted rotors, comprising:

a housing;

a first rotor erected in said housing, said first rotor having a first shaft end supported on a first pair of bearings and a second shaft end supported on a second pair of bearings;

a second rotor erected in said housing, said second rotor having a third shaft end supported on a third pair of bearings and a fourth shaft end supported on a fourth pair of bearings which are situated opposite said second pair of bearings, said second and fourth pairs of bearings each including bearing elements, one bearing of said second pair of bearings and one bearing of said fourth pair of bearings each having a stationary outer ring and a rotating inner ring which extend outside of and hold said bearing elements of said one respective bearing and which extend on one side of the other bearing of said second pair of bearings and the other bearing of said fourth pair of bearings, respectively, said stationary outer rings each having a protruding part in which at least two openings are provided; and at least one spray element erected between said second pair of bearings and said fourth pair of bearings for spraying lubricating liquid on said second and fourth pairs of bearings, said spray element having a nozzle situated in one of said openings in said protruding parts.

7. A machine according to claim 6, wherein said at least one spray element comprises a first spray element at one end of said first and second rotors which is directed towards first and second ridged rings situated around said first shaft end between said first pair of bearings and around said third shaft end between said third pair of bearings, respectively; and wherein the machine includes a second spray element at the other end of said first and second rotors which is directed between said second and fourth pairs of bearings, said second spray element being substantially identical to said first spray element.

8. A machine according to claim 6, wherein said machine comprises a compressor.

9. A machine according to claim 6, wherein said spray element includes a first radial tube which extends into one of said openings in said stationary outer ring of said one bearing of said second pair of bearings and a second radial tube which extends into one of said openings in said stationary outer ring of said one bearing of said fourth pair of bearings.

10. A machine according to claim 6, wherein said one bearing of said second pair of bearings and said one bearing of said fourth pair of bearings are ball bearings.

11. A machine according to claim 10, wherein each of said rotating inner rings of said one bearings of said second and fourth pairs of bearings have a protruding part on one side of said one bearing which has a smaller thickness than that of said rotating inner ring on the other side of said one bearing.

12. A machine according to claim 6, wherein said protruding parts of said stationary outer rings and said rotating inner rings of said one bearings of said second and fourth pairs of bearings extend practically to the other bearings of said second and fourth pairs of bearings, respectively.

* * * * *